Feb. 13, 1951     G. R. CUTHBERTSON ET AL     2,541,506

METHOD OF BUILDING PNEUMATIC TIRES

Filed April 29, 1949

INVENTOR
GEORGE R. CUTHBERTSON
BY ROBERT R. MILLER

Charles C. Willson
ATTORNEY

Patented Feb. 13, 1951

2,541,506

UNITED STATES PATENT OFFICE 2,541,506

METHOD OF BUILDING PNEUMATIC TIRES

George R. Cuthbertson and Robert R. Miller, Detroit, Mich., assignors to United States Rubber Company, New York, N. Y., a corporation of New Jersey Application April 29, 1949, Serial No. 90,518

8 Claims. (Cl. 154—14)

This invention relates to pneumatic tires and, in particular, it relates to a method of assembling certain components of the tire. More particularly, the invention relates to the construction of the outer plies of a tire carcass and to the method of assembling such outer plies and of securing the tread thereto.

In the manufacture of pneumatic tires, it has been general practice to form the plies of the tire carcass so that the plies constitute a layer of cord fabric interposed between layers of rubber stock. The ply, therefore, presents a relatively smooth outer surface with the cords of the fabric embedded between the rubber layers. When such plies are used either as the outer ply of the carcass or a breaker ply and a tread is assembled over the plies, the finished tire occasionally results in failure due to a "blow" or separation between the adjacent surfaces of the tread and the outer ply of the carcass. This "blow" occurs as a result of trapped air between the outer ply and the tread, or as a result of the generation of gases in this locality during the vulcanization or use of the tire.

We have found that if instead of applying the tread directly over the layer of rubber which encases the layer of cord fabric, the tread is applied to an outer carcass ply in which the cords are exposed, the "blows" can be eliminated. The reason for this is that the presence of the exposed cords adjacent to the tread enables the trapped air or gases to be absorbed by the cords and dissipated so as to prevent any localized presence of gases. Instead of the gases becoming trapped between layers of rubber as heretofore, such confined air or generated gas will permeate the interstices of the cords. In this way, any localized gaseous pressure is relieved and the gases are carried along the cords where they are either retained or dissipated by diffusion into or through the rubber composition.

Figure 1:
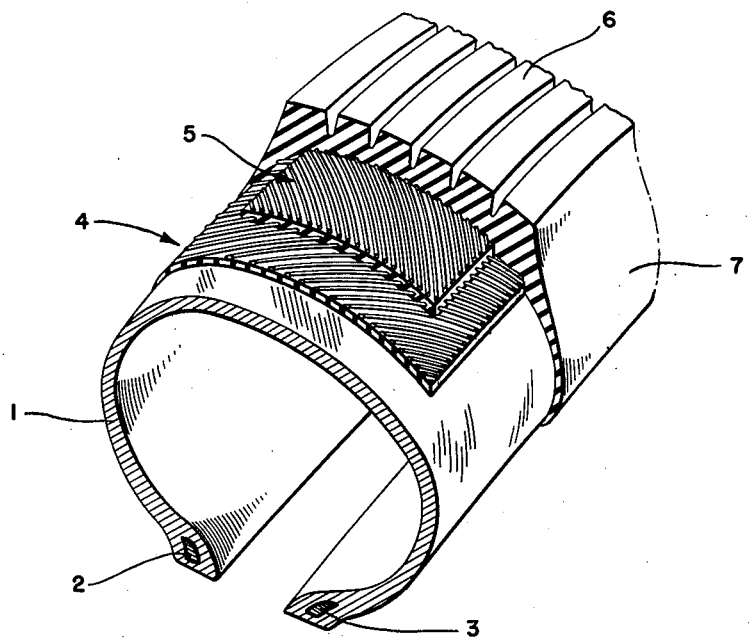
Figure 2:
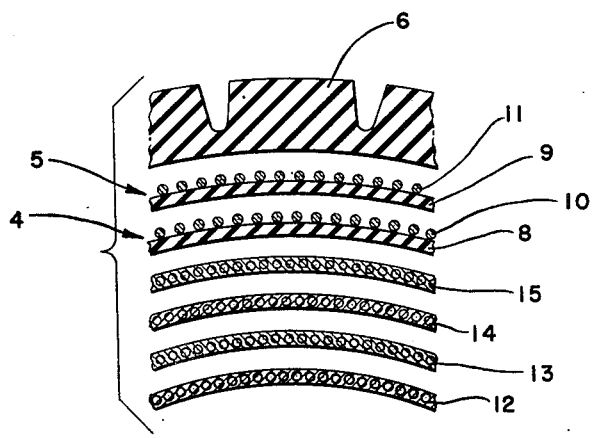

It is therefore a primary object of our invention to provide a pneumatic tire which is, to a high degree free from separation between the tread and the carcass, thus increasing the life of the tire, and to obtain such a benefit without any additional operational steps in the building of the tire. Such advantages will appear more fully in the following detailed description when considered in connection with the accompanying drawing, in which:

Figure 1 is a perspective view, in section, of a portion of a pneumatic tire illustrating an embodiment of our invention; and Figure 2 is an exploded view, in section, illustrating the relative position of a portion of the components of the tire of our invention.

With reference to the drawing and, in particular, to Figure 1, we show an embodiment of our invention comprising essentially a pneumatic tire constituting a carcass 1 formed of plies of strain resisting elements anchored to substantially inextensible beads 2 and 3. Breaker plies 4 and 5 are positioned over the crown portion of the carcass 1. A tread 6 and side wall portion 7 form an outer encasement for the carcass 1. The view shown in Figure 1 is intended to illustrate the tire after it is vulcanized.

The breaker plies 4 and 5 are each formed of a layer of rubber 8 and 9 respectively over which a layer of cords 10 and 11 respectively are laid. These cords may, if desired, be the same as the cords used in the rest of the tire carcass. The layers of rubber 8 and 9 are usually formed of carcass stock which is ordinarily of a softer composition than the tread stock. The cords 10 and 11 are positioned in reverse diagonal relationship as shown, and are spaced apart a distance equal to about 9 ends per inch. As shown in Figure 2, the carcass 1 consists of plies 12, 13, 14 and 15 of usual construction and representing the first, second, third and fourth plies respectively.

The cords 10 and 11 may be formed of cotton, rayon, nylon or steel. However, the construction of the present invention is more particularly applicable to the use of cotton cords because of the greater complexity of the interstices of the cotton fibers which afford greater opportunity for the absorption or transmission of gases.

In the formation of an improved pneumatic tire according to our invention, the tire carcass is made up in the usual manner except that the outer plies or breaker plies such as 4 and 5 are provided with the exposed cords 10 and 11 respectively. When the tread is applied over the breaker or outer plies, it is stitched down by rollers pressed tightly thereagainst. During this stitching operation, any air or gas which may be trapped between the underside of the tread and the outer plies is allowed to dissipate or be absorbed by the cords. After the tire is placed in a mold and vulcanized, any gases which may be generated in the region between the outer plies and the tread during vulcanization is likewise dissipated in the exposed cords. Accordingly, all localized areas in which pressure may be built up by the presence of gases is relieved so that the tread rubber will merge and bond with the outer plies of the carcass.

While the cords 10 and 11 are herein described as exposed, they may be covered with a thin film of latex, which should be sufficiently pervious to allow the trapped air or gases to reach the cords.

The above mentioned "blow" may occur when the tire is being vulcanized or when it heats up when in use, and the present construction greatly reduces the likelihood of such a blow occurring.

While the breakers in the present illustration show two plies, it is to be understood that only the outer ply need incorporate the exposed cords. There is an advantage, however, in utilizing the exposed cords for both breakers 4 and 5 because part of the breaker 4 contacts with the tread 6. Also, the use of exposed cords between breaker plies is advantageous because the same objects are obtained in that trapped air or generated gases are not accumulated between the two breaker plies.

While we have referred to the breaker plies as having exposed cords, it is to be understood that if breaker plies are not used in a tire, then the same benefits of eliminating trapped gases may be obtained by providing exposed cords on the outermost carcass ply, such as ply 15.

While reference is made to rubber and rubber compositions, it is to be understood that the term "rubber" is intended to include natural rubber and synthetic rubber or combinations thereof.

Having thus described our invention what we claim and desire to protect by Letters Patent is:

1. The method of manufacturing pneumatic tires comprising the steps, applying to a tire carcass a breaker strip comprising a sheet of rubber having cords bonded thereto so that they are exposed at its outer face and are sufficiently free from rubber to enable them to absorb gases trapped at such outer face, applying a tread over these exposed cords of the breaker strip, and placing the tire in a mold and vulcanizing.

2. The method of manufacturing pneumatic tires comprising the steps, applying to a tire carcass a breaker strip comprising a sheet of rubber having cords bonded thereto so that they are exposed at its outer face and are sufficiently free from rubber to enable them to absorb gases trapped at such outer face, applying a tread over these exposed cords of the breaker strip, stitching the tread against the breaker, and placing the tire in a mold and vulcanizing.

3. The method of manufacturing pneumatic tires comprising the steps, forming a tire carcass of plies of strain resisting elements comprising cord fabric interposed between layers of rubber, providing an outer ply comprising a sheet of rubber having cords bonded thereto so that they are exposed at its outer face and are sufficiently free from rubber to enable them to absorb gases trapped at such outer face, applying a tread in direct contact engagement with the exposed cords, and placing the tire in a mold and vulcanizing.

4. The method of manufacturing pneumatic tires comprising the steps, forming a tire carcass of plies of strain resisting elements comprising cord fabric interposed between layers of rubber, providing an outer ply comprising a sheet of rubber having cords bonded thereto so that they are exposed at its outer face at least at the crown portion thereof and are sufficiently free from rubber to enable them to absorb gases trapped at such outer face, applying a tread in direct contact engagement with the exposed cords, and placing the tire in a mold and vulcanizing.

5. The method of manufacturing pneumatic tires comprising the steps, forming a tire carcass of plies of strain resisting elements comprising cord fabric interposed between layers of rubber, applying over the carcass a breaker strip comprising a sheet of rubber having cords extending diagonally thereof and bonded thereto so that they are exposed at its outer face and are sufficiently free from rubber to enable them to absorb gases trapped at such outer face, applying a tread in direct contact engagement with said exposed cords, and placing the tire in a mold and vulcanizing.

6. The method of manufacturing pneumatic tires comprising the steps, forming a tire carcass of plies of strain resisting elements comprising cord fabric interposed between layers of rubber, applying over at least the crown portion of the carcass a breaker strip comprising a sheet of rubber having cords extending diagonally thereof and bonded thereto so that they are exposed at its outer face and are sufficiently free from rubber to enable them to absorb gases trapped at such outer face, applying a tread in direct contact engagement with said exposed cords, and placing the tire in a mold and vulcanizing.

7. The method of manufacturing pneumatic tires comprising the steps, forming a tire carcass of plies of strain resisting elements comprising cord fabric interposed between layers of rubber, applying over the carcass a breaker strip comprising a sheet of rubber having cords extending diagonally thereof in the crown of the tire, applying over the breaker strip a second breaker strip having exposed cords extending in an opposite diagonal relationship over the first breaker strip so that they are sufficiently free from rubber to enable them to absorb gases trapped at the surface of this breaker strip, applying a tread in direct contact engagement with said exposed cords, and placing the tire in a mold and vulcanizing.

8. The method of manufacturing pneumatic tires comprising the steps, forming a tire carcass of plies of strain resisting elements comprising cord fabric interposed between layers of rubber, applying over the carcass a breaker strip comprising a sheet of rubber having cords extending diagonally thereof in the crown of the tire, applying over the breaker strip a second breaker strip of less width than the first breaker strip and having exposed cords extending in an opposite diagonal relationship over the first breaker strip so that they are sufficiently free from rubber to enable them to absorb gases trapped at the surface of this breaker strip, applying a tread in direct contact engagement with said exposed cords, and placing the tire in a mold and vulcanizing.

GEORGE R. CUTHBERTSON.
ROBERT R. MILLER.

REFERENCES CITED

The following references are of record in the file of this patent:

UNITED STATES PATENTS

| Number | Name | Date |
| --- | --- | --- |
| 1,453,865 | Dickinson et al. | May 1, 1923 |
| 1,862,492 | Mallory | June 7, 1932 |
| 2,231,359 | Day | Feb. 11, 1941 |
| 2,451,973 | Purdy | Oct. 19, 1948 |